United States Patent
Bamberger et al.

(10) Patent No.: US 10,554,045 B2
(45) Date of Patent: Feb. 4, 2020

(54) CONTROL UNIT

(71) Applicant: Siemens Aktiengesellschaft, Munich (DE)

(72) Inventors: Joachim Bamberger, Munich (DE); Andrei Szabo, Ottobrunn (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 141 days.

(21) Appl. No.: 15/807,729

(22) Filed: Nov. 9, 2017

(65) Prior Publication Data
US 2018/0175621 A1 Jun. 21, 2018

(30) Foreign Application Priority Data

Dec. 20, 2016 (EP) .................................... 16205306

(51) Int. Cl.
*H02J 3/32* (2006.01)
*H02J 7/00* (2006.01)
(Continued)

(52) U.S. Cl.
CPC ................ *H02J 3/32* (2013.01); *H02J 3/382* (2013.01); *H02J 7/0068* (2013.01); *H02J 3/381* (2013.01); *H02J 2003/003* (2013.01)

(58) Field of Classification Search
CPC ........ H02J 3/32; H02J 3/46; H02J 3/14; H02J 2003/003; H02J 7/00; H02J 7/0068;
(Continued)

(56) References Cited

U.S. PATENT DOCUMENTS

2007/0239816 A1* 10/2007 Gordienko ............. G05B 19/07
708/490
2008/0046387 A1* 2/2008 Gopal ..................... G01D 4/004
705/412
(Continued)

FOREIGN PATENT DOCUMENTS

EP 1511109 A2 3/2005
WO WO 2015139061 A1 9/2015

OTHER PUBLICATIONS

Extended European Search Report, 16205306.0-1804, dated Jun. 29, 2017.

*Primary Examiner* — Rexford N Barnie
*Assistant Examiner* — Jagdeep S Dhillon
(74) *Attorney, Agent, or Firm* — Harness, Dickey & Pierce, P.L.C.

(57) ABSTRACT

A control unit includes a power supply device with a battery store including at least one battery unit; a first energy conversion device that converts nonelectrical energy into electrical energy; and a connecting unit configured such that a summed energy for the electrical energy of the energy conversion device and battery store is deliverable. The control unit receives an instantaneous output power or a future output power requirement of the first energy conversion device and further receives a predicted power of the first energy conversion device for at least one future time. The instantaneous output power or the future output power requirement and the predicted power are used to ascertain a required power at the future time. At least one battery unit is switched on in response to the threshold value being exceeded by the required power.

21 Claims, 2 Drawing Sheets

(51) Int. Cl.
*H02J 3/38* (2006.01)
*H02J 3/00* (2006.01)

(58) Field of Classification Search
CPC ......... G06F 1/30; G05B 19/102; G05B 19/10; H02P 9/04
USPC .......... 307/21, 46, 66; 700/287, 291; 290/44
See application file for complete search history.

(56) References Cited

U.S. PATENT DOCUMENTS

| | | | |
|---|---|---|---|
| 2008/0278003 A1* | 11/2008 | Pouchet | H02J 9/062 |
| | | | 307/66 |
| 2009/0076661 A1* | 3/2009 | Pearson | H01M 8/04619 |
| | | | 700/291 |
| 2010/0140937 A1* | 6/2010 | Kirchner | F03D 7/026 |
| | | | 290/44 |
| 2011/0276188 A1* | 11/2011 | Beck | H02J 7/35 |
| | | | 700/287 |
| 2016/0261115 A1* | 9/2016 | Asati | H02J 3/14 |

* cited by examiner

CONTROL UNIT

PRIORITY STATEMENT

The present application hereby claims priority under 35 U.S.C. § 119 to European patent application number EP 16205306.0 filed Dec. 20, 2016, the entire contents of which are hereby incorporated herein by reference.

FIELD

At least one embodiment of the invention generally relates to a control unit for a power supply device; a power supply device and/or a method for a power supply device.

BACKGROUND

Hybrid electrical power plants combine renewable energy generation with nonrenewable or conventional energy generation and storage thereof. These power supply devices have to meet various regulations, particularly if they are integrated in power distribution systems, electrical supply systems or grids. The aim is to make a stable supply of energy or power available, both in large power distribution systems and in separate systems.

In the case of renewable energy generation by energy conversion devices, e.g. by photovoltaic installations, which convert solar energy into electrical energy, or wind energy installations, which convert wind energy into electrical energy, the converted or generated electrical energy is subject to certain fluctuations, since the renewable energies are not available invariably over time. The electrical output power of an energy conversion device for renewable energies varies depending on the weather, e.g. sunshine duration or cloud cover in the case of photovoltaic installations or wind speed in the case of wind power installations.

To compensate for this, battery stores or battery energy storage systems, BESS for short, for example, are provided in said power supply devices.

These are connected via a connecting unit to the energy conversion devices, for example particularly to energy conversion devices for renewable energies. This connecting unit brings together the supplied electrical energies and delivers them as summed energy at its output. In this case, the summed energy may also have only a supplied energy of an energy conversion device.

The battery stores transform the chemical energy stored in the cell into DC power that is then converted by inverters into AC power, if need be transformed by transformers, and delivered.

The battery stores have at least one battery unit, usually multiple battery units that are used for energy storage. The battery stores have their separate controllers for management, energy delivery, charging or/and energy storage. These controllers and the battery stores consequently themselves require energy in order to make certain of their own operation, and have losses. This intrinsic energy requirement is not inconsiderable.

These battery stores are further not available immediately, but rather have a startup time that may be in the region of seconds to one minute or a few minutes, for example.

SUMMARY

The inventors have discovered that therefore, the battery stores typically run continually. They therefore have a continual power draw. This power draw or power loss may be significant and can adversely influence the power balance of the power supply device.

At least one embodiment of the present invention is directed to improving a power supply device, particularly to improve the energy balance.

At least one embodiment of the present invention is directed to a control unit for a power supply device; and further by a power supply device and/or a method.

According to at least one embodiment of the invention, a control unit is provided. The control unit is suitable for a power supply device, wherein the power supply device has:

a battery store having at least one battery unit that has a startup time, i.e. a time from when the battery store or the battery unit is switched on to when electrical energy is made available—which can be in the region of a few seconds to one or more minutes, for example, and a battery power, a first energy conversion device that converts nonelectrical energy into electrical energy, and a connecting unit that is connected to the battery store and the first energy conversion device and that is configured such that a summed energy for the electrical energy of the energy conversion device and of the battery store is deliverable at its output, characterized in that the control unit receives an instantaneous output power of the first energy conversion device or a future output power requirement;

in that the control unit receives a predicted power of the first energy conversion device for at least one future time; and in that the control unit is configured such that firstly the instantaneous output power or the future output power requirement and secondly the predicted power are used to ascertain a required power at the future time, the required power is compared with a first threshold value and at least one battery unit is switched on if said threshold value is exceeded.

According to at least one embodiment of the invention, a power supply device is disclosed, including the control unit.

According to at least one embodiment of the invention, a method for a power supply device comprises:

a battery store (BS) having at least one battery unit (BE) that has a startup time (tb) and a battery power (PBE), a first energy conversion device (EU1) that converts nonelectrical energy into electrical energy, a connecting unit (VE) that is connected to the battery store (BS) and the first energy conversion device (EU1) and delivers a summed energy for the electrical energy of the first energy conversion device (EU1) and of the battery store (BS) at its output (AE), characterized in that an instantaneous output power (Po(to)) of the first energy conversion device (EU1) or a future output power requirement (PA(t)) and a predicted power (Pf (t)) of the first energy conversion device (EU1) for at least one future time are used to ascertain a required power (PBESS) for the future time, the required power (PBESS) is compared with a first threshold value and at least one battery unit (BE) is switched on if said threshold value is exceeded.

BRIEF DESCRIPTION OF THE DRAWINGS

The properties, features and advantages of this invention that are described and the manner in which they are achieved will become clearer and more distinctly comprehensible in connection with the description of the example embodiment that follows, these being explained in more detail in connection with the drawings, in which.

DETAILED DESCRIPTION OF THE EXAMPLE EMBODIMENTS

Figure 1:
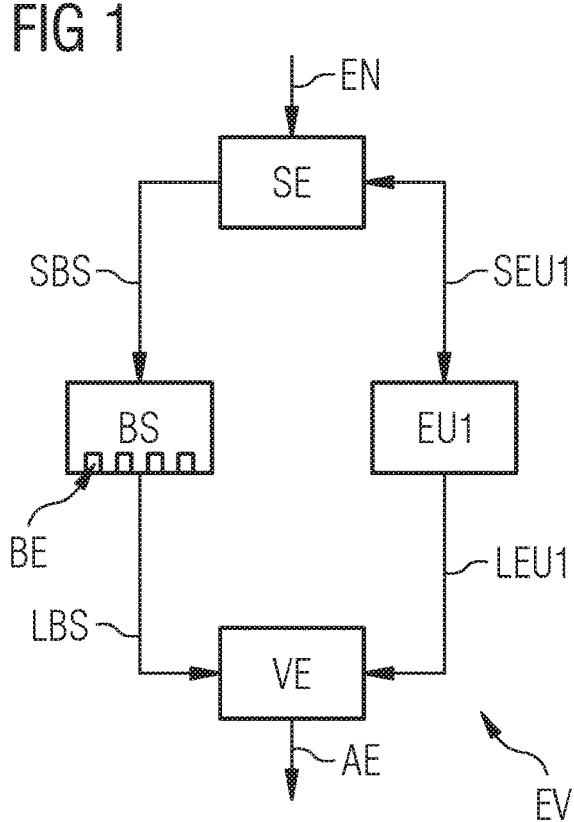
FIG. 1 shows a first block diagram of a power supply device.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one embodiment of the invention, a control unit is provided. The control unit is suitable for a power supply device, wherein the power supply device has:
 a battery store having at least one battery unit that has a startup time, i.e. a time from when the battery store or the battery unit is switched on to when electrical energy is made available—which can be in the region of a few seconds to one or more minutes, for example, and a battery power,
 a first energy conversion device that converts nonelectrical energy into electrical energy, and
 a connecting unit that is connected to the battery store and the first energy conversion device and that is configured such that a summed energy for the electrical energy of the energy conversion device and of the battery store is deliverable at its output.

The control unit is supplied, according to at least one embodiment of the invention, with an instantaneous output power of the first energy conversion device or with a future output power requirement, particularly of the power supply device or of the first energy conversion device.

The control unit is further, according to at least one embodiment of the invention, supplied with a predicted power of the first energy conversion device for at least one future time.

The control unit, which has a microprocessor, for example, is configured such that firstly the instantaneous output power or the future output power requirement and secondly the predicted power are used to ascertain a required power at the future time. The required power is compared with a first threshold value and at least one battery unit is switched on if said threshold value is exceeded. When there are multiple battery units, the necessary number of battery units is switched on in order to make the required power available. The first threshold value may be the value zero, for example, so that a battery unit or a battery store is connected for positive required powers. The first threshold value may also be in the positive range if small drops below the power requirement are acceptable or brief fluctuations are tolerable or are supposed to be compensated for.

The first threshold value may also be in the negative range if a power reserve of the first energy conversion device drops below a critical level in order for sufficient temporary energy to be made available by the battery store/unit.

Further, at least one battery unit can be disconnected if there is sufficient energy from the energy conversion device, i.e. if there is a drop below the first threshold value or a drop below a second threshold value.

This has the particular advantage that battery stores or battery units with a power requirement are connected only if energy is actually needed from them. Otherwise, they are disconnected. Therefore, no intrinsic energy is consumed for the battery stores, which improves the energy balance.

Advantageous configurations of the invention are specified in the claims.

In one advantageous configuration of at least one embodiment of the invention, in which the control unit receives a planned output power of the first energy conversion device (or of the power supply device) as future output power requirement, i.e. a power that the first energy conversion device or the power supply device is intended to make available at at least one later time, the control unit is configured such that the planned output power and the predicted power are used to ascertain the required power at the future time. The required power is ascertained particularly using the difference between planned output power as minuend and predicted power as subtrahend.

This has the particular advantage that optimum energy management is available for a power supply device with a defined requirement at different times.

In one advantageous configuration of at least one embodiment of the invention, in which the control unit receives the instantaneous output power of the first energy conversion device (no future output power requirement), the control unit is configured such that the instantaneous output power is used to ascertain a computed output power at the future time. The computed output power and the predicted power are used to ascertain the required power at the future time.

This has the particular advantage that optimum energy management is made possible based on the currently measured output power, for example directly as an output variable of the energy conversion device that is supplied to the control unit, or by measurement via a sensor, for example.

In one advantageous configuration of at least one embodiment of the invention, the control unit is configured such that the required power is the difference between computed output power as minuend and predicted power as subtrahend.

This has the particular advantage that a specific option for computing is specified for energy management.

In one advantageous configuration of at least one embodiment of the invention, the control unit is configured such that the computed output power is the difference between the instantaneous output power as minuend and a safety reduction as subtrahend. The safety reduction may be particularly a product of a rise per unit time, what is known as a ramp rate, and the time difference between future time and present time.

This has the particular advantage that there is a simple option for ascertaining the future output power of the energy conversion device.

In one advantageous configuration of at least one embodiment of the invention, the first energy conversion device converts renewable energy into electrical energy.

This has the particular advantage that at least one embodiment of the invention has its particular strengths in this case, since particularly the availability of renewable energies is subject to a strong fluctuation over time that is improved by the energy management according to the invention via temporary connection and disconnection of the battery store or the battery unit.

In one advantageous configuration of at least one embodiment of the invention, the first power supply device is connectable to a load that has a load power with a load power tolerance. The first energy conversion device has a rated power at least equal to or greater than the load power. The control unit receives a predicted load power, which is the load power for at least one future time, as predicted power. The control unit is configured such that the rated power and the predicted load power are used to ascertain the required power at the future time.

This has the particular advantage that at least one embodiment of the inventive concept is used on the basis of the load power requirement so as thereby to improve energy management.

In one advantageous configuration of at least one embodiment of the invention, the control unit is configured such that the required power is the difference between predicted load power as minuend and rated power as subtrahend.

This has the particular advantage that there is a simple specific option for ascertaining the required power.

In one advantageous configuration of at least one embodiment of the invention, the first energy conversion device converts nonrenewable energy into electrical energy.

This has the particular advantage that, particularly given the predicted load power, there is temporary customization of the supply of energy by battery power without influencing conventional power generation.

In one advantageous configuration of at least one embodiment of the invention, when there are multiple battery units of the battery store the control unit is configured such that the number of battery units to be switched on is ascertained using the quotient, rounded up to an integer, of required power as dividend and battery power of the battery unit as divisor.

This has the particular advantage that there is an option for individually connecting battery units, as a result of which the power of battery units that are not required is reduced, since these are not switched on. Therefore, the energy balance is improved.

In one advantageous configuration of at least one embodiment of the invention, the future time is greater than or equal to the sum of the present time and the startup time.

This has the particular advantage that planning is effected beyond the startup time, which means that there is always an adequate supply of energy available with optimum energy balance.

In one advantageous configuration of at least one embodiment of the invention, the control unit is configured such that switching on the at least one battery unit at the present time is delayed by an offset time if the future time is greater than the sum of the present time and the startup time, the maximum offset time being obtained particularly from the difference between future time as minuend and sum of present time and startup time as subtrahend.

This has the particular advantage that a battery unit is optimally available precisely at the time at which it is required. That is to say that the startup time of the battery unit ends when the energy of the battery unit is required, or a short time beforehand. This achieves optimum energy management, avoiding the consumption of energy for battery units/stores that are not required.

In one advantageous configuration of at least one embodiment of the invention, a power supply device has a control unit according to the invention.

This has the particular advantage that all the advantages can be realized in one system.

In one advantageous configuration of at least one embodiment of the invention, a method according to the invention for a power supply device is provided.

This has the particular advantage that a corresponding operating method can be realized.

All the configurations, both in dependent form with reference back to the independent patent claim and with reference back merely to individual features or combinations of features of patent claims, bring about an improvement in a power supply device.

FIG. 1 shows a block diagram of a power supply device EV, having a first energy conversion device EU1 that converts renewable or nonrenewable energy into electrical energy, for example; a battery store BS, having at least one battery unit BE; a connecting unit VE that is connected to the first energy conversion device EU1 via a first energy line LEU1 and to the battery store via a second energy line LBS, and delivers a summed energy for the electrical energy of the first energy conversion device and of the battery store at its output AE. In this case, one of the two energies supplied may be equal to zero, so that the summed energy consists only of one supplied energy.

According to at least one embodiment of the invention, a control unit SE is provided that may be connected to the first energy conversion device EU1 via a first control line SEU1 and is connected to the battery store BS via a second control line SBS.

The first control line LEU1 makes an instantaneous output power of the first energy conversion device EU1 available to the control unit SE, for example. This information can also be made available by a sensor or the like instead of the first energy conversion device EU1.

The second control line SBS can be used to switch the battery store BS on or/and off. When there are multiple battery units BE, single battery units can be switched on or/and off.

The control unit has at least one input EN via which a predicted power of the first energy conversion device can be supplied or is supplied. Alternatively, a predicted load power or/and rated power or/and further parameters, such as load power, load power tolerance, etc.

Figure 2:
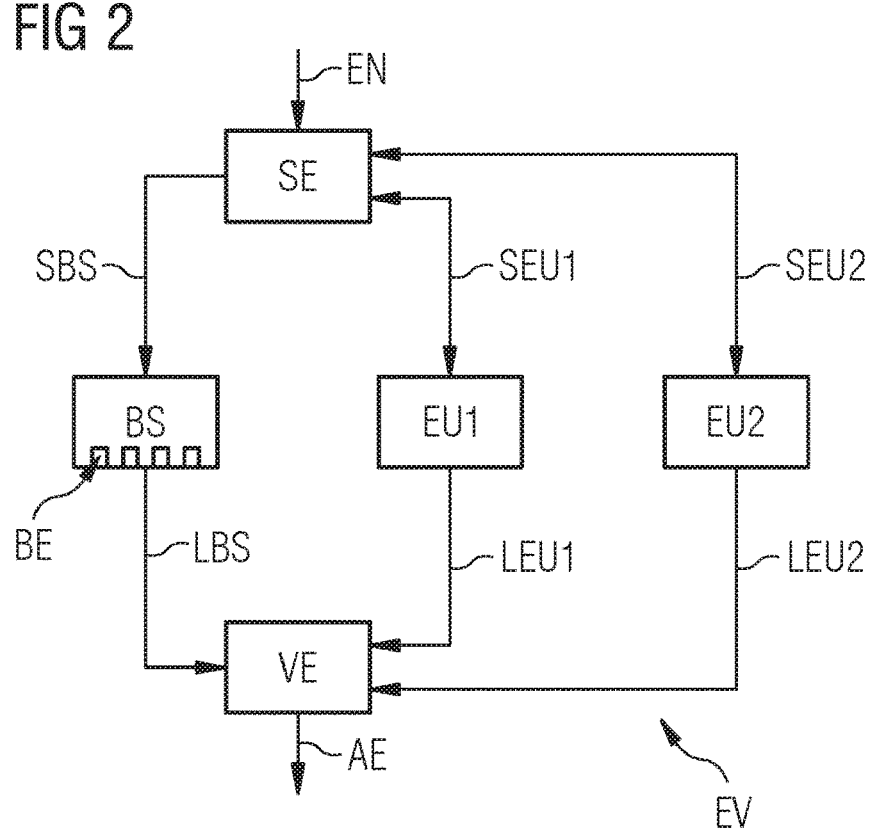
FIG. 2 shows a second block diagram of a power supply device.

FIG. 2 shows a depiction according to FIG. 1, with the difference that a second energy conversion device EU2 is provided. Said second energy conversion device converts renewable or nonrenewable energy into electrical energy, for example. If the first energy conversion device EU1 converts renewable energy into electrical energy, for example, then the second energy conversion device EU2 can convert nonrenewable energy into electrical energy, or vice versa. The second energy conversion device EU2 is connected to the connecting unit in an analogous manner by a third energy line LEU2 and may be connected to the control unit by a third control line SEU2.

Figure 3:
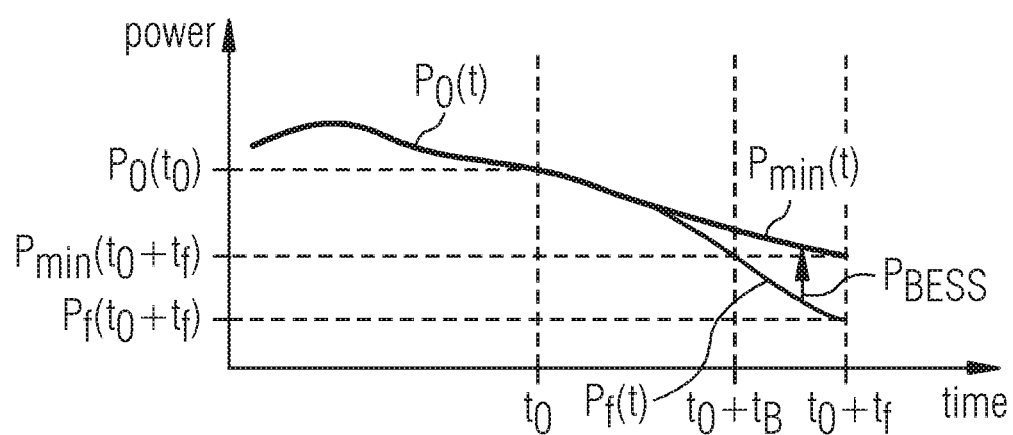
FIG. 3 shows a first graph to explain an embodiment of the invention.

FIG. 3 shows a first graph of a power characteristic, power, over time, time. In this case, the time axis, time, has a first time to, for the present time; a second time to+tB, which represents the sum of the present time to and the startup time tB of the battery store/battery unit, i.e. the time at which the battery store has started up, i.e. the battery power is available; a third time to+tf, which is the sum of the present time to and a time difference tf that represents the future time to+tf, the feature time tf being after the startup time tB. This third time to+tf is the time for which a power required according to the invention is computed or a forecast is made in order to make sufficient power available as a result, for example by switching on battery power, or to lower the energy consumption of the battery store, for example by disconnecting battery store or battery units.

FIG. 3 depicts a power characteristic over time for the instantaneous output power Po(t), for example of the first energy conversion unit EU1, which converts renewable energy into electrical energy, for example, up to the first time to. From the first time to onward, a linear characteristic of Pmin(t) is depicted, on the one hand, which represents the computed output power that can be ascertained using a safety reduction for the instantaneous output power at the first time to, for example, the safety reduction becoming greater as time increases, for example, that is to say as a result of the product of a rise per unit time and the time difference at a or the future time(s), for example, resulting in a linearly falling characteristic, as depicted in FIG. 3.

From the first time to onward, a further characteristic Pf(t) is depicted, on the other hand, which represents a predicted power, for example for the first energy conversion device EU1, which converts renewable energy into electrical energy, for example, over time for the future.

The result of the difference between computed power Pmin(t) and predicted power Pf(t) is the required power PBESS for a future time t. If this exceeds a first threshold value, the at least one battery unit is connected. If this required power drops below the same or a second threshold value, the at least one battery unit can be disconnected.

If multiple battery units are available, battery units can be connected and disconnected individually according to the ratio of battery power and required power. Only as many battery units as necessary for the power required need to be on or connected and, analogously, off or disconnected.

Figure 4:
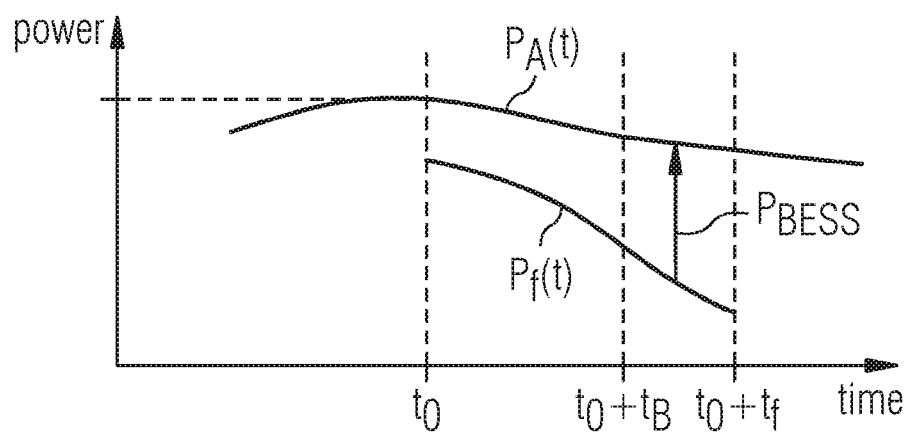
FIG. 4 shows a second graph to explain an embodiment of the invention.

FIG. 4 shows a second graph according to FIG. 3, with the difference that the power characteristic of a future output power requirement PA(t) over time, time, is depicted. In addition, a predicted power Pf(t) over time, time, is depicted. The required power PBESS for a time is obtained from the difference between output power requirement PA(t) and predicted power Pf(t).

A further explanation of at least one embodiment of the invention will be provided below.

At least one embodiment of the invention is best suited to modular battery stores, i.e. having multiple battery units, which have one inverter per battery unit, for example, and can thus be fed and switched off independently of one another.

The main concept of at least one embodiment of the invention is that of attaining individual customization of battery units in respect of the energy required for a power supply device, in order thus to achieve optimum customization and minimum (intrinsic) power consumption.

The number of switched-on battery units or modules is based on a forecast of the required power. The prediction period, i.e. at least one future time, may be provided by the starting time of the battery stores or battery units and could correspond to or be greater than at least the startup time tb.

If the battery store BS has only one battery unit BE, then the entire battery store BS can be switched off if it is forecast that no battery power is required for a future period.

At least one embodiment of the invention is based on the following points or steps:

1. Forecast of the renewable energy, i.e. the predicted power of the energy conversion device. The forecast period should be equal to or greater than the startup time or starting time of the battery store BS or battery unit BE. The forecast of predicted power can be based preferably on local measurements, for example, which afford a good short-term forecast.

An example of such a forecast for energy conversion devices based on photovoltaic installations and the photovoltaic power thereof can be provided by images of the sky, the images being evaluated via automatic image processing, for example, so that the level of cloud cover can be ascertained and the probable photovoltaic power can be ascertained or estimated.

One option for wind power installations can be based on what are known as LIDAR wind measurements, for example, which can be used to ascertain wind speed.

If no predictions are possible, a forecast can be provided via the currently measured power of the energy conversion device, which converts renewable energy into electrical energy, for example. For example with a reduction in the instantaneously/currently measured power that increases over time, as depicted in FIG. 3 by the computed output power Pmin(t).

In addition, assumptions about the future of the available renewable energy output can be made for the predicted power. In the worst case, one assumption may be that the predicted power is zero or dips to zero immediately or within a period of time.

2. Computation of the required battery store power during the forecast time.

The computation considers the predicted power, particularly for renewable energy conversion devices, the future output power requirement or/and stability conditions for the power distribution system.

Examples of such computations are listed below:

2.1 Measurement of the instantaneous output power of an energy conversion device, for example for renewable energies, and computation of the computed output power of the energy conversion device for at least one future time. This can be effected using a safety reduction that increases over time, that is to say has the shape of a ramp, as shown in FIG. 3. The absolute variation over time is supposed to be smaller than a prescribed value.

The rise can be defined as a maximum difference per unit time, for example as a percentage of the instantaneous or nominal output power per unit time, e.g. 10%/minute.

The maximum power of the power supply is, in the simplest case, the sum of (renewable) energy generation and maximum power of the battery store.

The minimum required battery store power is in this case equal to the difference between the computed output power for the future time, according to the ramp function, and the predicted power of the (renewable) energy conversion device, as depicted in FIG. 3.

The computed or minimum required output power of the installation is computed as:

$$Pmin(t)=Po(to)-RR*(t-to)$$

where:
RR Rise per unit time
RR*(t-to) Safety reduction
Po(to) Instantaneous output power
Pmin(t) Computed output power The required battery store power is computed as:

$$PBESS(t)=Pmin(t)-Pf(t)$$

where:
Pf(t) Predicted power
PBESS(t) Required power

It can also be assumed that:
If Pmin(t)−Pf(t)<0, then PBESS(t)=0

If the battery store power is computed not only for a future time but rather for an entire period of time, then the maximum value for the battery store power can be chosen from the period of time.

By way of example, the period of time chosen is the period to and to+tB:

$$PBESS=\max\ (PBESS(t))\ \text{for }t\text{ between }to\text{ and }to+tB.$$

PBESS is the minimum power of the battery store that needs to be made available. This is available only after the startup time, which is why it should be computed beforehand, ideally at least for the period of the startup time beforehand. If the computation has been performed for the period of the startup time, the battery store needs to be started at the present time. Otherwise, it does not need to be started until at a correspondingly later time, so that the battery power is available at the required time. That is to say that the control unit that performs the computation is configured such that switching on the at least one battery unit is delayed by an offset time if the future time is greater than the sum of the present time and the startup time. In this case, the offset time is no more than the difference between the future time as minuend and the sum of the present time and the startup time as subtrahend. The offset time can then be stipulated individually. At the maximum value of the offset time, the maximum energy is saved.

If multiple battery units are included in the battery store, the number N of said battery units can be computed:

$$N=ceil(PBESS/PBE),$$

where:
PBE Power of one battery unit
Ceil Smallest integer that is greater than or equal to the number that the division yields PBE is the available power of one battery unit, it being assumed for simplification purposes that all the battery units or modules have the same power.

It is therefore necessary for N battery units BE to be switched on.

The other battery units are switched off. The energy consumption thereof is saved.

2.2 Power planning: The power of the installation is announced at a fixed time beforehand or a plan exists for how much power is supposed to be available at what time, i.e. there is a future output power requirement PA(t) of the power supply device or energy conversion device.

By way of example, the future output power requirement can be announced one day beforehand.

The future required power of the battery store is in this case the difference between the output power requirement and the predicted power, as depicted in FIG. 4.

The computation is effected as above, where:

$$Pmin(t)=PA(t)$$

where:
PA(t) Output power requirement 2.3 Power reserve: The stability of the system is often realized by sufficient reserve power. The reserve power is the amount of energy that is kept on standby and is effectively available immediately if the load increases or energy generation decreases unexpectedly.

In nonrenewable or conventional energy generation, e.g. by diesel generators, this reserve power is often made available by battery stores BS.

Based on the forecast of the load, and perhaps renewable energy sources, i.e. if two or more energy conversion devices are provided, the reserve power or power reserve is computed.

The required power or minimum required battery power can be computed from the difference between the reserve power and the level of the reserve from other sources.

$$PBESS(t)=Preserve(t)-Pconventional(t)$$

where:
Pconventional(t) Rated power of the energy conversion device, particularly, an energy conversion device based on nonrenewable energies
Preserve(t) Load power, this fluctuating with a load power tolerance Further, it can hold that:
If Preserve(t)−Pconventional(t)<0, then PBESS(t)=0

Where Preserve(t) can further be computed on the basis of the short-term forecast of the renewable sources and the load.

The computation is effected as depicted above.

EXAMPLE

A load with 100 KW power that fluctuates with +/−50 KW load power tolerance is connected to a power supply device. The first energy conversion device is based on nonrenewable energies, for example, and has a rated power of 120 KW, for example a diesel generator.

The nominal power of the first energy conversion device is therefore 100 KW, conditional upon the load power of 100 KW of the load. It has a reserve of 20 KW.

(120 KW−100 KW=20 KW)

Since the load requires a maximum of 150 KW, a reserve power of the battery store of 30 KW is required.

This needs to be connected only if the load power exceeds 120 KW (20 KW reserve through first energy conversion device). The connection is made according to computation via the predicted load power.

If the battery store has three 10 KW battery units, 30 KW in total, for example, the first battery unit is connected for a required load power of over 120 KW; two battery units for over 130 KW and three battery units for over 140 KW.

Since the power reserve can also be provided by other energy conversion devices, these need to be taken into consideration as appropriate. Similarly, the disconnection of loads allows the energy requirement to be regulated in an analogous manner.

Battery stores or battery units that are not required are disconnected and thus losses therefrom are saved.

In the controller, the computation explained is constantly repeated, for example either for a particular future time or for an entire future period of time. By way of example, the computation can be repeated every 3 seconds, 5 seconds, 10 seconds, 20 seconds, 30 seconds, . . . , every minute, etc.

For the correct operation and stability of the system, the energy content of the battery stores or battery units needs to be monitored. Further, there should always be sufficient energy available in the battery store for the required period of time. The period for which the battery store energy content needs to be sufficient may be the period comprising the present time and the startup time, i.e. to to to+tB, for example. The same applies to the periods of time from the present time to future time to+tf.

Normally, this is not the limiting factor, because the periods of time tB, tf are fairly short.

A similar situation applies to the case in which the battery stores need to be charged. This can be effected when more energy or power is available than is needed, for example.

The advantage of at least one embodiment of the invention is the combination of the forecast of the required power from the battery store taking into consideration the startup time of the battery store.

This makes certain that the battery store or the battery unit is switched on in good time. Further, the intrinsic energy requirement is minimized.

Switching off battery stores or battery units that are not required reduces the power draw and aging.

Although the invention has been illustrated and described in detail by the example embodiment, the invention is not limited to the examples disclosed and other variations can be derived therefrom by a person skilled in the art without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A control unit for a power supply device, the power supply device including
    a battery store including at least one battery unit with a startup time and a battery power,
    a first energy conversion device to convert nonelectrical energy into electrical energy,
    a connecting unit, connected to the battery store and the first energy conversion device, configured such that a summed energy for the electrical energy of the first energy conversion device and of the battery store is deliverable at its output, the control unit being configured to:
    receive an instantaneous output power of the first energy conversion device or a future output power requirement,
    receive a predicted power of the first energy conversion device for at least one future time, wherein the at least one future time is greater than or equal to a sum of the present time and the startup time;
    use firstly the instantaneous output power or the future output power requirement, and secondly the predicted power, to ascertain a required power at the at least one future time;
    compare the required power with a first threshold value; and
    switch at least one battery unit on, in response to the comparing indicating that the required power exceeds the first threshold value.

2. The control unit of claim 1, wherein the control unit is further configured to
    receive a planned output power of the power supply device as future output power requirement, and wherein the control unit is further configured such that the planned output power and the predicted power are useable to ascertain the required power at the at least one future time.

3. The control unit of claim 1, wherein the control unit is further configured to
    receive an instantaneous output power of the first energy conversion device, and wherein the control unit is configured such that the instantaneous output power is usable to ascertain a computed output power for the at least one future time, the computed output power and the predicted power being usable to ascertain the required power for the at least one future time.

4. The control unit of claim 3, wherein the control unit is configured such that the required power is a difference between computed output power as a minuend and a predicted power as a subtrahend.

5. The control unit of claim 3, wherein the control unit is configured such that the computed output power is a difference between the instantaneous output power as a minuend and a safety reduction as a subtrahend.

6. The control unit of claim 1, wherein the first energy conversion device is configured to convert renewable energy into electrical energy.

7. The control unit of claim 1, wherein the first power supply device is connectable to a load that has a load power with a load power tolerance, the first energy conversion device includes a rated power at least equal to or greater than the load power, and wherein the control unit is configured to receive a predicted load power, which is a load power for at least one future time, as a predicted power, and wherein the control unit is configured such that the rated power and the predicted load power are usable to ascertain the required power at the at least one future time.

8. The control unit of claim 7, wherein the control unit is configured such that the required power is a difference between predicted load power as a minuend and rated power as a subtrahend.

9. The control unit of claim 7, wherein the first energy conversion device is configured to convert nonrenewable energy into electrical energy.

10. The control unit of claim 9, further comprising:
a second energy conversion device, configured to convert renewable energy into electrical energy, with a rated power variance, wherein the control unit is configured such that the required power is ascertainable via the rated power, predicted power and rated power variance.

11. The control unit of claim 1, wherein, upon the battery store including multiple battery units, the control unit is configured such that a number of the multiple battery units to be switched on is ascertainable using a quotient, rounded up to an integer, of required power as a dividend and battery power of the battery unit as a divisor.

12. The control unit of claim 1, wherein the control unit is further configured such that switching on the at least one battery unit at the present time is delayed by an offset time upon the at least one future time being greater than a sum of the present time and the startup time.

13. A power supply device comprising the control unit of claim 1.

14. A method for a power supply device including a battery store including at least one battery unit including a startup time and a battery power, a first energy conversion device to convert nonelectrical energy into electrical energy, and a connecting unit, connected to the battery store and the first energy conversion device, configured to deliver a summed energy for electrical energy of the first energy conversion device and of the battery store at its output, the method comprising:
using an instantaneous output power of the first energy conversion device or a future output power requirement and a predicted power of the first energy conversion device for at least one future time, to ascertain a required power for the at least one future time, wherein at least one the future time is greater than or equal to a sum of the present time and the startup time;
comparing the required power with a first threshold value; and
switching on at least one battery unit in response to the comparing indicating that the required power exceeds the first threshold value.

15. The control unit of claim 2, wherein the required power is ascertainable using a difference between planned output power as a minuend and predicted power as a subtrahend.

16. The control unit of claim 2, wherein the control unit is further configured to
receive an instantaneous output power of the first energy conversion device, and wherein the control unit is configured such that the instantaneous output power is usable to ascertain a computed output power for the at least one future time, the computed output power and the predicted power being usable to ascertain the required power for the at least one future time.

17. The control unit of claim 16, wherein the control unit is configured such that the required power is a difference between computed output power as a minuend and a predicted power as a subtrahend.

18. The control unit of claim 4, wherein the control unit is configured such that the computed output power is a difference between the instantaneous output power as a minuend and a safety reduction as a subtrahend.

19. The control unit of claim 5, wherein the safety reduction is a product of a rise per unit time and a time difference between future time and present time.

20. The control unit of claim 8, wherein the first energy conversion device is configured to convert nonrenewable energy into electrical energy.

21. The control unit of claim 12, wherein a maximum offset time is obtainable from a difference between the at least one future time as a minuend and a sum of the present time and the startup time as a subtrahend.

* * * * *